Sept. 15, 1970　　　　　J. M. JONES, JR　　　　　3,528,125
METHOD OF PROCESSING SHRIMP AND RELATED SHELLFISH
Filed Feb. 12, 1968　　　　　　　　　　　　　　3 Sheets-Sheet 1

INVENTOR
JOHN M. JONES JR.

BY *Semmes and Semmes*

ATTORNEYS

Sept. 15, 1970      J. M. JONES, JR      3,528,125

METHOD OF PROCESSING SHRIMP AND RELATED SHELLFISH

Filed Feb. 12, 1968      3 Sheets-Sheet 2

INVENTOR
JOHN M. JONES JR.

BY *Semmes and Semmes*

ATTORNEYS

Sept. 15, 1970  J. M. JONES, JR  3,528,125
METHOD OF PROCESSING SHRIMP AND RELATED SHELLFISH
Filed Feb. 12, 1968  3 Sheets-Sheet 3

INVENTOR
JOHN M. JONES JR.

BY *Semmes and Semmes*

ATTORNEYS

United States Patent Office 3,528,125
Patented Sept. 15, 1970

3,528,125
METHOD OF PROCESSING SHRIMP AND RELATED SHELLFISH
John M. Jones, Jr., Mobile, Ala., assignor to General Tool Company, Inc.
Filed Feb. 12, 1968, Ser. No. 704,630
Int. Cl. A22c 29/00
U.S. Cl. 17—48                                    3 Claims

ABSTRACT OF THE DISCLOSURE

This system and apparatus is designed to take freshly caught shrimp and related shellfish from the ocean and seas and to process on board the trawler whereby they may be immediately preserved for human consumption. In short, the system includes a means for setting individual shellfish to excise the heads thereof; sequentially orienting the deheaded shellfish for conveyance to and through a deveining step, sequentially deshelling the shellfish and thereafter grading same for storage, be it either form of cold storage at freezing or non-freezing temperatures. The apparatus involved is peculiarly mobile and highly compact as will appear from the following description.

BACKGROUND OF THE INVENTION

Earlier, John M. Jones, Sr. devised means for deveining shrimp as represented by Pat. 2,684,500. That concept and others have since been substantially modified to result in the system described hereinafter, which is especially suited to utility on board fishing trawlers. Heretofore the steps of sorting, heading, deveining, shelling, grading, packaging, storing and the like have all been conducted by the ship hands. These practices became so burdensome as not to be engaged in on board the trawler, to detriment of the useful life of the shellfish in storage and precedent to consumption.

FIELD OF THE INVENTION

The field of the invention is such as to include all shellfish having anatomy in conformation to that of the shrimp, viz: seabobs, duck shrimp, Alaskan shrimp and the like,

DESCRIPTION OF THE PREFERRED EMBODIMENTS

The device comprises a portable unit 100 having removable sides 110–110′ with handles 112–112′, sides 120–120′ and removable top 130 overlapping in part the initial conveying system 200.

Figure 1:
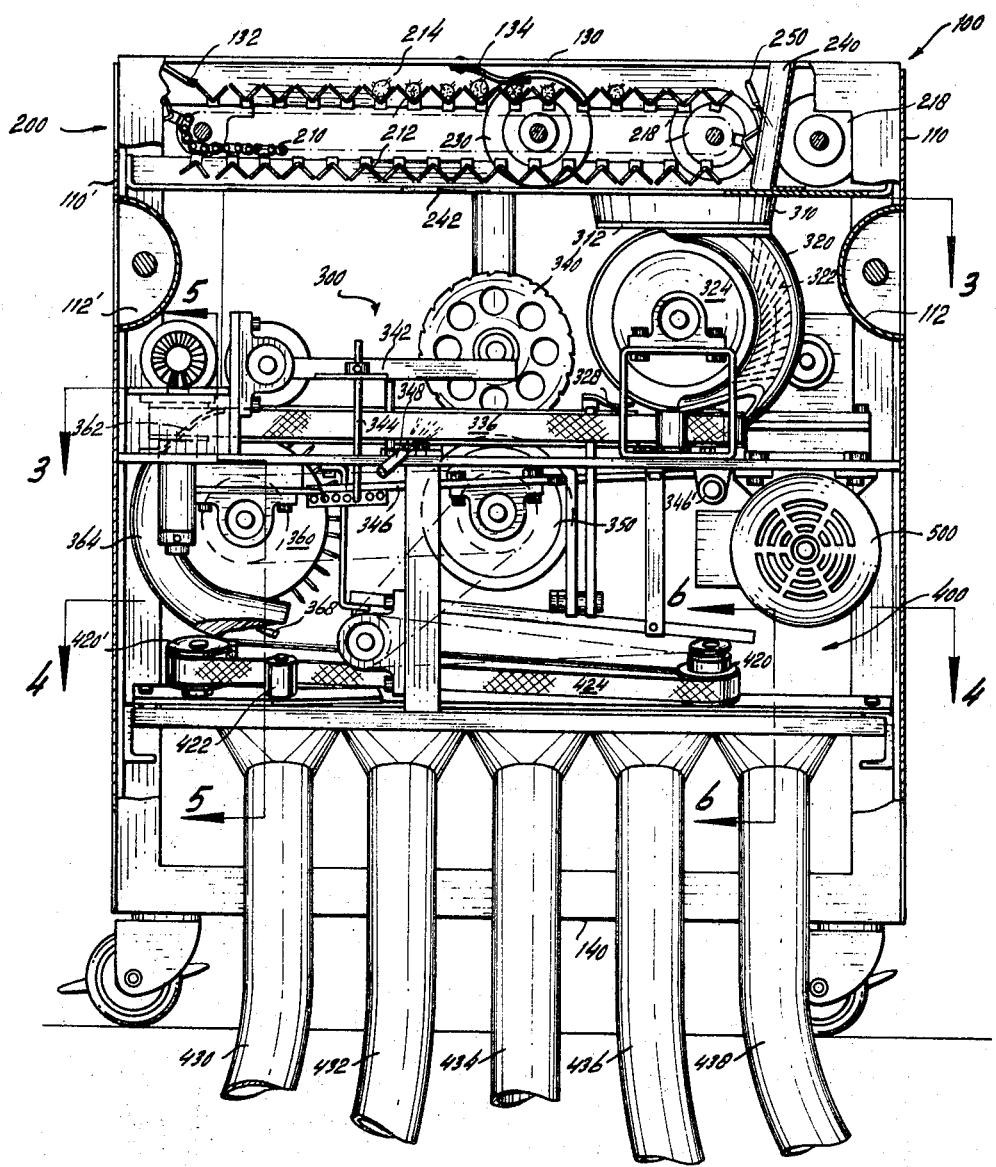
FIG. 1 is a view in side elevation of the invention, portions thereof being cut away to reveal the basic conveyor and related deveining and deshelling components.

Referring now to FIG. 1, the device 100 comprises essentially three levels 200, 300 and 400, the mechanisms of each level being generally represented by the series indicated.

Figure 2:
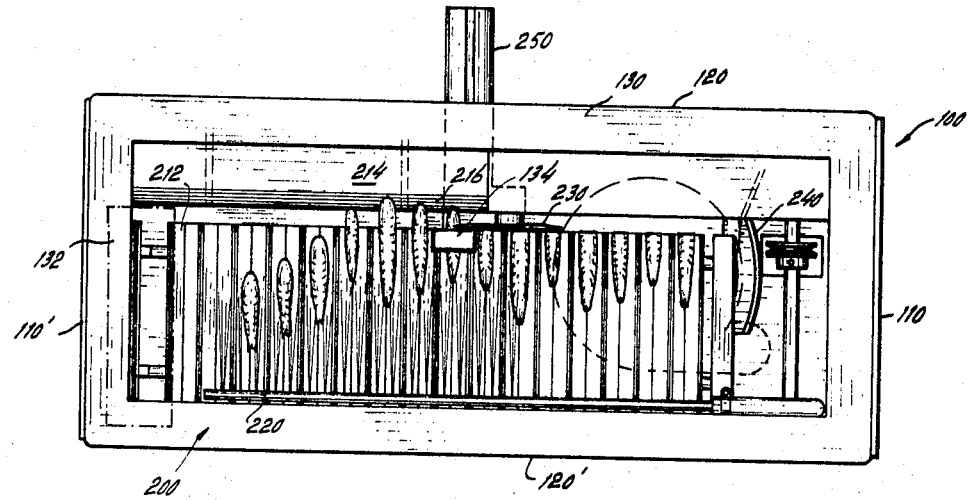
FIG. 2 is a top plan view of invention showing the deheading and conveying portion of the system.

Referring to the uppermost conveyor level 200, it will be noted that within the top cover is disposed a conveyor system 210 to the links of which are secured independently movable shellfish troughs 212, the respective troughs being adapted to receive shellfish dropped on the delivery plate 132 and to transport same generally in a clockwise direction immediately adjacent the graduated positioner slide plate 214 and immediately beneath the path defined by the horizontally disposed spray component 220. See FIGS. 1 and 2. Drive for the system is effected from motor 500 by pulley 218 and take-off wheel 218′. Attached to the cover 130 is the spring steel plate holder 134, the same being adapted to secure the positioned shellfish into the seat formed by the respective troughs simultaneously as the heads are severed from the shellfish by action of the deheader blade 230. In practice, the shellfish are individually dropped onto the chute 132 (head to left), transported clockwise via the troughs 212, whereupon the respective shellfish are positioned head-first by the action of the sprays 220 onto the horizontally graduated slide 214, the slide being disposed at an angle and having shellfish head engaging grooves 216, the same being adapted to the correct transverse positioning of shellfish of varying thickness with respect to the deheader 230. The sprays 220, being directed to the base of the respective troughs are discontinued at a position which is substantially adjacent the axis of the deheader 230. In the vicinity of the delivery chute 240, the action of the deheaded shellfish in transfer is augmented by the water spray 250, directed adjustably angularly downwardly with respect to the chute 240. The fixed trough underlying the conveyor is represented by the numeral 242, the same providing base for the chute 240 and being sloped in the direction of the water chute 250 to dispose of the water accumulated by the various sprays 220 and 250 used in positioning and in dislodging the shellfish from the conveyor.

Figure 3:
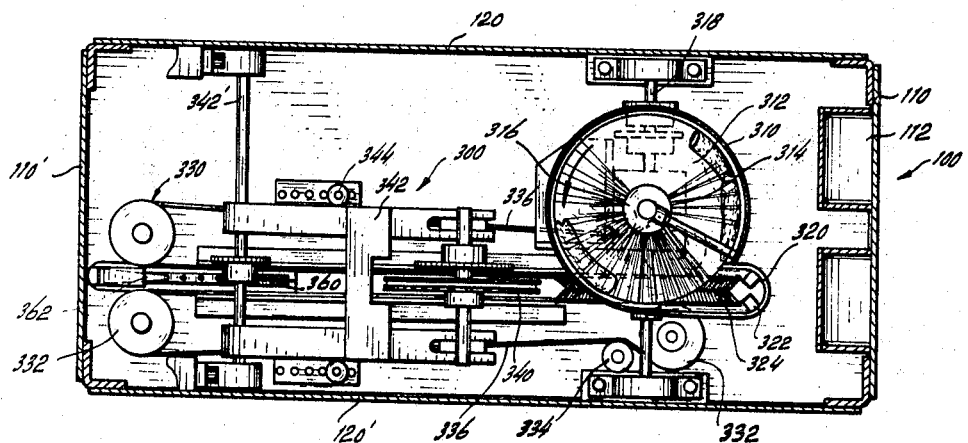
FIG. 3 is a view of the invention taken along the lines 3—3 of FIG. 1 showing the transfer and deveining portions of the system.
Figure 4:
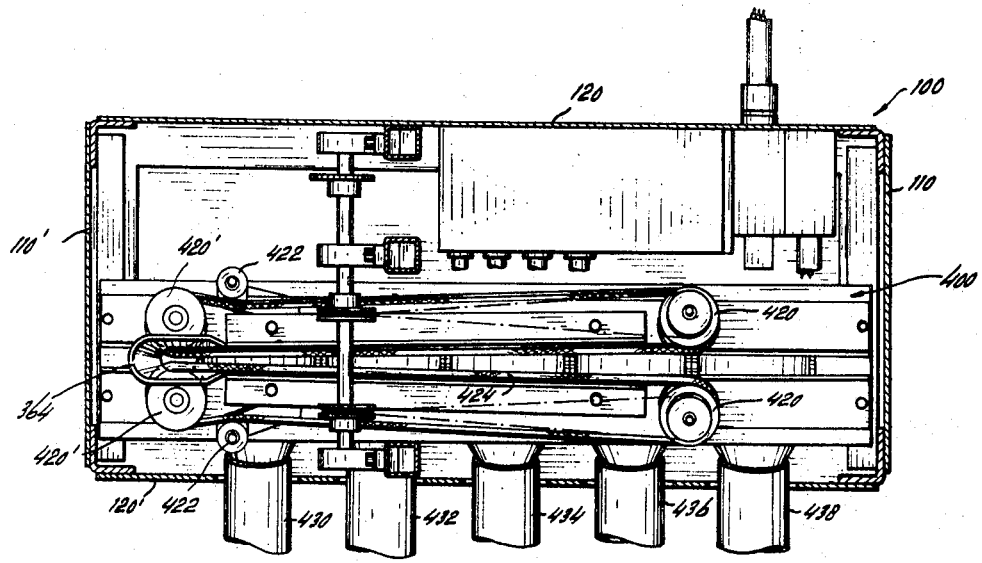
FIG. 4 is a sectional view of invention taken along the lines 4—4 of FIG. 1 revealing the means for movably grading deveined and deshelled shellfish.
Figure 5:
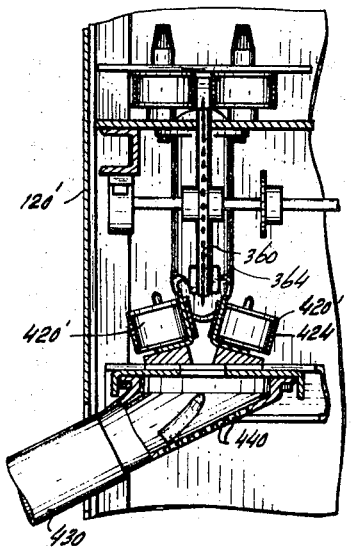
FIG. 5 is a vertical sectional view in fragment of that portion of the invention comprising the deshelling and grading, illustrated in FIG. 1.
Figure 6:
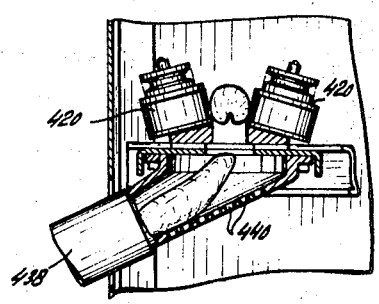
FIG. 6 is a vertical sectional view of the grading system illustrated in FIG. 1 at 6—6 thereof, shown in fragment.

The second treatment level represented by the series 300 is best shown in FIGS. 1 and 3.

The level 300 of the embodiment shown includes the turntable housing 310 having the turntable 312 disposed centrally thereof. The turntable is preferably radially grooved to provide a friction surface for the shellfish. An arcuately coaxial spray element 314 comprises in the right hand-most portion at least five sprays which are adapted to jet against the circular walls of the housing 310, keeping the shellfish on their right sides and preventing the backs thereof from sliding toward the center of the turntable or dropping on their left sides. Moving by the turntable in a counterclockwise direction, as shown, the shrimp are engaged by other plural sprays 316 emanating from the center of the turntable outwardly to the sides, said sprays being adapted to increase in force by a peculiar sizing of the apertures forming the spray nozzle. The apertures are preferably square and increasing in magnitude counterclockwise from the area generally indicated as at 10 o'clock to the area generally indicated as approximately 4 o'clock. These sprays 316 are adapted to force the shrimp to stand on their feet and to enter the feeding chute 320 headless end first, whereby the spring elements 322 engage the back of the shrimp, forcing the legs thereof into the V-shaped cavity of the transfer wheel 324. Thus the respective shellfish are urged against the transfer wheel feet in, back out, to be received by the conveyor 336 feet up back down and secured therein for compression conveyance beyond that point. Then the shellfish are depressed downwardly by the compressor spring 328 (FIG. 1), precedent to further adjustable compression by the wheel 340, which said wheel is mounted in lever engagement via the adjustable pin 344. A corresponding lever element 346 seats pivot 346′, of the severing and deveining blade 350 into corresponding registry, irrespective of size of the shrimp. Thus, the compression wheel 340 and severing wheel 350 (although they may be adjusted axially at any suitable distance), are adapted to ride upward and downward of the conveyor 336 depending upon the size of the shrimp passing thereunder. As the compressor 340 rides up over a large shellfish, the deveiner would move upward to the same degree by action of connecting lever 342 pivoting at 342'. The conveyor has suitable tension means 334–334' (the latter not shown) indicated as pulleys intermediate the sheave ends of the respective elements comprising the conveyor, namely the belts 336 shown on either side of the track. The conveyor is set on pulleys 330–332 and driven through gears, not shown, by drive 318, the same being connected in turn to the motor 500. Following the cleaning station indicated by the compressor 340 and severing wheel 350, the shrimp are transported by the compression engagement of opposed belts 336 to the transfer station generally indicated at 360 with deflector 362. Tined wheel 360 is adapted to tine engagement with the shrimp to pull same from the abraded compression action of the conveyor 336, whereby the shells are removed from the body and the meat transferred arcuately downwardly through the chute 364 to be forcibly ejected by the prong 368 and thereafter to be engaged by the grader conveyor 400 hereinafter described.

With reference now to the grading system 400 appearing on the third and lowermost level from the top and noting especially FIGS. 1, 4, 5 and 6 respectively, the now-deshelled and deveined meat has been transferred through the arcuate funnel 364 by means of the tined wheel 360 and removed therefrom by the fixed plow prong 368 for deposit, irrespective of size on the angularly divergent belts represented by the numeral 424, adjustment to said belts being effected through corresponding elements 422, found adjacent the pulleys 420', said pulleys being aligned with the chute axis of the component 364, whereby to receive in moving contact, the respective meats. It will be noted that the opposed belt sheaves 420 are spatially separated transversely a greater distance than the corresponding sheaves 420', thereby yielding an increased gap in the conveyor system components whereby to deposit the respective shrimp size for size in the grading chutes 430, 432, 434, 436 and 438 respectively for freezing and storage thereafter. The cuhtes are foraminous at 440 to relieve water spray residue.

I claim:
1. A system of dressing non-graded shellfish in a confined area as for example on trawlers and the like, utilizing gravitational movement of shellfish comprising the sequential steps of:
(A) conveying partially confined shellfish while simultaneously selectively positioning them for deheading, irrespective of size thereof;
(B) individually deheading the partially confined shellfish while conveying same;
(C) positionally transferring the deheaded shellfish while securing the deheaded shellfish back down—feet up and;
(D) conveying the positioned shellfish for deveining;
(E) deveining same while holding against displacement;
(F) deshelling the deveined shellfish followed by transfer thereof; and
(G) grading the shellfish.

2. The system of claim 1 wherein the shellfish are trough confined and positioning is effected by progressive application of transfer fluid pressure directed against the moving shellfish.

3. The system of claim 1 wherein conveyance for deveining is effected by opposed compression conveyance and the deveining by self adjusting knife and shellfish compression means.

References Cited
UNITED STATES PATENTS

| | | | |
|---|---|---|---|
| 1,367,546 | 2/1921 | Hirth et al. | 17—71 |
| 1,627,479 | 5/1927 | Bucknam | 17—73 |
| 2,034,691 | 3/1936 | Bottker et al. | 17—73 |
| 2,546,414 | 3/1951 | Abbott | 17—73 |
| 2,784,450 | 3/1957 | Jonsson | 17—48 |

LUCIE H. LAUDENSLAGER, Primary Examiner

U.S. Cl. X.R.

17—71